United States Patent
Rylander

(10) Patent No.: US 8,825,335 B2
(45) Date of Patent: Sep. 2, 2014

(54) METHOD FOR CONTROLLING THE YAW MOMENT OF A VEHICLE

(75) Inventor: Christian Rylander, Helsingborg (SE)

(73) Assignee: BorgWarner TorqTransfer Systems AB, Landskrona (SE)

(*) Notice: Subject to any disclaimer, the term of this patent is extended or adjusted under 35 U.S.C. 154(b) by 0 days.

(21) Appl. No.: 13/522,168

(22) PCT Filed: Jan. 25, 2011

(86) PCT No.: PCT/EP2011/050966
§ 371 (c)(1),
(2), (4) Date: Jan. 22, 2013

(87) PCT Pub. No.: WO2011/089264
PCT Pub. Date: Jul. 28, 2011

(65) Prior Publication Data
US 2013/0325283 A1 Dec. 5, 2013

(30) Foreign Application Priority Data
Jan. 25, 2010 (SE) .................................. 2010000071

(51) Int. Cl.
*G06F 17/00* (2006.01)
(52) U.S. Cl.
USPC ........................................................ 701/82
(58) Field of Classification Search
USPC ........................................................ 701/82
See application file for complete search history.

(56) References Cited

U.S. PATENT DOCUMENTS

| | | | | |
|---|---|---|---|---|
| 4,941,541 A * | 7/1990 | Ito et al. | .................... | 180/414 |
| 5,388,658 A * | 2/1995 | Ando et al. | .................... | 180/197 |
| 5,774,819 A * | 6/1998 | Yamamoto et al. | ............. | 701/41 |
| 5,941,334 A * | 8/1999 | Inagaki | .................... | 180/242 |
| 6,154,696 A * | 11/2000 | Nishi et al. | .................... | 701/41 |
| 6,415,215 B1 * | 7/2002 | Nishizaki et al. | ............... | 701/70 |
| 6,968,920 B2 * | 11/2005 | Barton et al. | ................ | 180/446 |
| 7,386,379 B2 * | 6/2008 | Naik et al. | .................... | 701/41 |
| 7,610,982 B2 * | 11/2009 | Matsuno et al. | ............. | 180/245 |
| 7,949,456 B2 * | 5/2011 | Miura | .................... | 701/72 |
| 8,340,865 B2 * | 12/2012 | Lee | .................... | 701/41 |
| 8,398,523 B2 * | 3/2013 | Nett et al. | .................... | 475/295 |
| 2005/0205339 A1* | 9/2005 | Aizawa et al. | ................ | 180/443 |

(Continued)

FOREIGN PATENT DOCUMENTS

| EP | 1958839 | 8/2008 |
|---|---|---|
| WO | 2010101506 | 9/2010 |

OTHER PUBLICATIONS

International Search Report mailed May 17, 2011, International Application No. PCT/EP2011/050966 filed Jan. 25, 2011; Applicant: Haldex Traction AB, 4 pages.

*Primary Examiner* — Thomas Tarcza
*Assistant Examiner* — Alex C Dunn
(74) *Attorney, Agent, or Firm* — BrooksGroup

(57) ABSTRACT

A method for determining the yaw tendency of a vehicle is hereby presented. The method comprises the steps of determining the propulsion states of one or several wheels of said vehicle, and estimating yaw moment variations of a vehicle from said propulsion states, wherein said yaw moment variations are induced from altered propulsion states between at least two of the wheels of said vehicle.

10 Claims, 5 Drawing Sheets

(56) References Cited

U.S. PATENT DOCUMENTS

| | | | |
|---|---|---|---|
| 2008/0029328 A1* | 2/2008 | Hoeck et al. | 180/248 |
| 2008/0234911 A1* | 9/2008 | Matsuno et al. | 701/82 |
| 2009/0157246 A1* | 6/2009 | Mori et al. | 701/22 |
| 2009/0248250 A1* | 10/2009 | Yasui et al. | 701/42 |
| 2010/0087989 A1* | 4/2010 | Yamanaka et al. | 701/41 |
| 2010/0241304 A1* | 9/2010 | Maeda | 701/29 |
| 2011/0257826 A1* | 10/2011 | Yu et al. | 701/29 |
| 2012/0049617 A1* | 3/2012 | Furuyama | 303/9.75 |

* cited by examiner

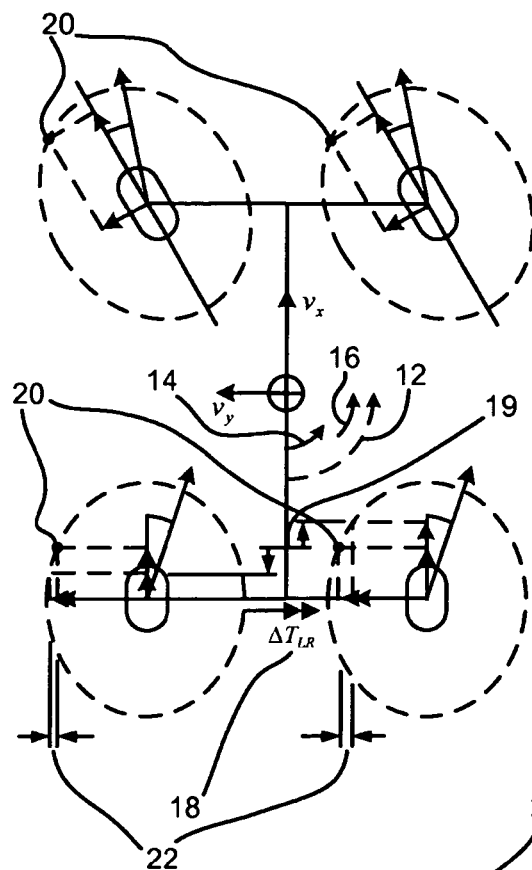
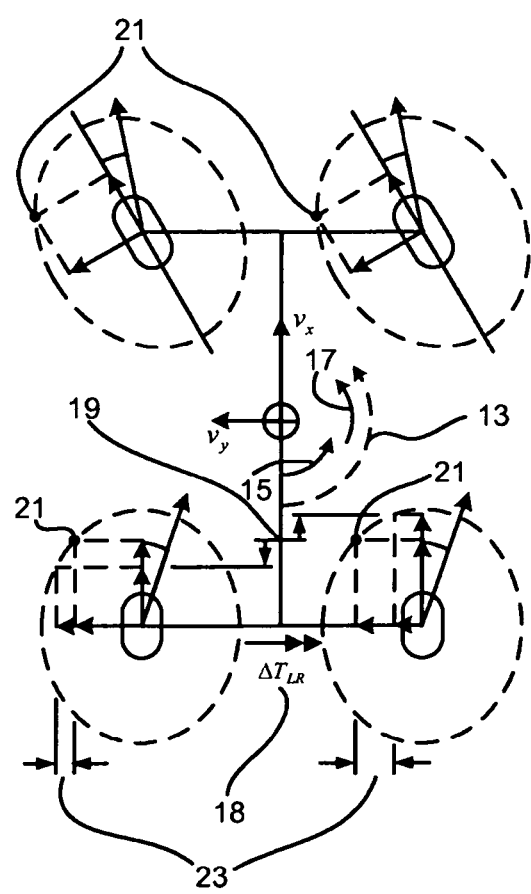
Fig. 2a
Fig. 2b

METHOD FOR CONTROLLING THE YAW MOMENT OF A VEHICLE

This application claims the benefit of Swedish Application No. 1000071-9 filed Jan. 25, 2010 and PCT Application No. EP2001/050966 filed Jan. 25, 2001.

FIELD OF THE INVENTION

The present invention relates to a method for determining the yaw tendency of a vehicle. Further, the present invention relates to a method and a device for controlling the yaw moment of a vehicle using the determined yaw tendency.

BACKGROUND ART

Four wheeled vehicles may have a driveline configuration allowing the drive train torque to be distributed longitudinally for enhancing lateral vehicle dynamics or for other enhancements, such as traction performance, noise reduction, fuel consumption, etc.

One of the primary objectives with controlling the longitudinal torque distribution in a motor vehicle is to change the effective yaw moment for vehicle dynamics reasons. A bicycle model with tire forces is shown in FIG. 1a-c. In FIG. 1a, showing the tire forces and the net yaw moment in the asymmetric plane of the vehicle, the vehicle is subject to an effective yaw moment 1. Here, the tractive and braking tire forces are excluded. Lateral tire forces 2, 3 are not only affected by the slip angles 4, 5, but due to the tire force ellipse 6 shown in FIG. 1b also by the longitudinal tire forces 7, 8 indicated in FIG. 1c, showing the tire forces and the net yaw moment in the asymmetric plane of the vehicle including the tractive and braking tire forces. This results in changed lateral tire forces 9, 10 and effective yaw moment 11.

This phenomenon is well known and widely used for attribute tuning of the yaw response of the vehicle. However, the same phenomenon also leads to trade-offs and compromises when controlling the longitudinal torque distribution for any other reason than lateral vehicle dynamics, such as e.g. fuel optimization, traction enhancement, noise, durability etc.

Vehicles having a capability of changing the driveline configuration may use torque vectoring. For example, a device for vectoring torque is described in WO2010/101506 by the same applicant.

One of the primary objectives with vectoring drive train torque in a motor vehicle is to change the effective yaw moment acting on the vehicle.

In FIGS. 2a and 2b, models of a vehicle having torque vectoring capabilities are shown. In FIG. 2a, the effective yaw moment 12 of a vehicle having lateral torque vectoring with front biased longitudinal torque distribution is shown. In FIG. 2b, the effective yaw moment 13 of a vehicle having lateral torque vectoring with rear biased longitudinal torque distribution is shown. In FIGS. 2a and 2b, the effective yaw moment 12, 13 is the sum of a net yaw moment 14, 15 excluding torque vectoring, and a second net yaw moment 16, 17 induced solely from lateral torque vectoring.

The net yaw moment 16, 17 induced from lateral torque vectoring 18 is not only a product of the differentiated longitudinal tire forces 19 and vehicle geometry, but is also an effect of altered lateral tire forces when the working points 20, 21 for the combined longitudinal and lateral tire forces change along the tire force ellipse. This phenomenon complicates the control of a lateral torque vectoring device as the relation between induced yaw moment 16, 17 and added torque input 18 becomes dependent on initial longitudinal tire forces. That is although the superimposed longitudinal tire forces 19 induced from the torque vectoring device are the same in FIGS. 2a and 2b, their effect 22, 23 on the total lateral force of wheel pairs are dependent on the initial longitudinal tire forces from wheel pairs propulsion plant.

As a consequence of the above described relations between longitudinal and lateral tire forces and their effect on the yaw moments 12, 13, 14, 15, 16, 17, it is troublesome to achieve consistent lateral vehicle behavior when distributing torque sideways in a vehicle with a non-fixed longitudinal torque distribution. This is due to the fact that both longitudinal and lateral torque redistribution affects the net yaw moment, and the yaw control authority of longitudinal and lateral torque redistribution, respectively, are dependent on the actual state of one another.

SUMMARY OF THE INVENTION

Accordingly, the present invention preferably seeks to mitigate, alleviate or eliminate one or more of the above-identified deficiencies in the art and disadvantages singly or in any combination and solves at least the above-mentioned problems by providing a method and a device according to the appended patent claims.

An object of the present invention is to provide an improved method for determining yaw tendency of a vehicle, the method being capable of allowing a more consistent lateral vehicle behavior, i.e. more consistent to changes in longitudinal torque distribution or changes in longitudinal slip distribution.

Another further object of the present invention is to provide an improved method for determining yaw tendency of a cornering vehicle.

A further object of the present invention is to provide a method and a device for causing a change in yaw moment of a vehicle, enabling a higher degree of freedom when changing the longitudinal or lateral torque distribution. That is, said method and device can be used to mask otherwise degraded vehicle dynamic performance, e.g. when longitudinal distribution is changed for energy reasons.

A yet further object of the present invention is to provide a method and device allowing for improved traction performance on split-mue surfaces.

Still another object of the present invention is to provide a method and a device enabling improved drivability on split-mue surfaces as a net tractive force is being generated without changing the torque from the propulsion plant.

An idea according to the present invention is to take the longitudinal propulsion state of at least one wheel of an axle into account when controlling a lateral torque vectoring.

According to a first aspect of the invention, a method for determining the yaw tendency of a vehicle is provided. The method comprises the steps of determining at least one propulsion state of one or several wheels of said vehicle, and determining the yaw tendency by estimating yaw moment variations of a vehicle from said at least one propulsion state, wherein said yaw moment variations are induced from altered propulsion states between at least two of the wheels of said vehicle.

Said at least one propulsion state may be a measure representing the longitudinal tire slip of a wheel and being selected from the group consisting of torque, force, slip, friction utilization, or differential speed. Said at least one propulsion state may further be a measure representing the longitudinal tire slip values of two wheels of a common side, common axle, or common diagonal, and being selected from one, or both of the following groups; i) torque distribution, force distribution, slip distribution and distribution of mue utilization, and ii) torque, force, slip, mue utilization and differential speed. This is advantageous in that the method may receive vehicle characteristics from the controlling modules of the vehicle, such as ESC, ABS, or other traction control systems, either directly or indirectly.

Said yaw moment variations may be induced from altered torque or slip distribution between a front axle and a rear axle of said vehicle, which is advantageous in that the method may be implemented in situations where driver preferences requires a change between e.g. rear drive and front drive, or between two wheel drive and four wheel drive.

Said yaw moment variations may be induced from altered torque or slip distribution between a left wheel and a right wheel of said vehicle, which is advantageous in that the method may be used in situations where one side of the vehicle experiences a lower friction than the other side.

According to a second aspect of the invention, a method for causing a change in yaw moment of a vehicle is provided. The method comprises the steps of determining the yaw tendency according to the first aspect of the invention, and utilizing said estimated yaw moment variations for changing the difference in torque, slip, or speed between a left wheel and a right wheel of said vehicle by i) calculating new values of the propulsion states of said left wheel and said right wheel counteracting the estimated yaw moment variations, and ii) applying said new values to said left wheel and said right wheel.

According to a third aspect of the invention, a method for causing a change in yaw moment of a vehicle is provided. The method comprises the steps of determining the yaw tendency according to the first aspect of the invention, and utilizing the estimated yaw moment variations for changing the difference in torque, slip, or speed between the front axle and the rear axle of said vehicle by i) calculating new values of the propulsion states of said front axle and said rear axle counteracting the estimated yaw moment variations, and ii) applying said new values to said front axle and said rear axle.

According to a fourth aspect of the invention, a method for causing a change in yaw moment of a vehicle is provided. The method comprises the steps of determining the yaw tendency according to the first aspect of the invention, and utilizing the estimated yaw moment variations for changing the propulsion state of at least one wheel by i) calculating a new value of the propulsion state of said at least one wheel counteracting the estimated yaw moment variations, and ii) applying said new value to said at least one wheel.

According to a fifth aspect of the invention, a controller used for determining the yaw tendency of a vehicle is provided. Said controller comprises a determination unit configured to determine at least one propulsion state of one or several wheels of said vehicle, and an estimation unit configured to estimate yaw moment variations of a vehicle from said at least one propulsion state.

The controller may further comprise a calculating unit configured to estimate new values of at least one propulsion state of at least one wheel of said vehicle to counteract the estimated yaw moment variations, and a signal generator configured to generate a signal corresponding to said estimated new values of the at least one propulsion state.

According to a sixth aspect of the invention, a device for applying a difference of the propulsion states between at least two wheels of a vehicle is provided. Said device comprises a controller according to the fifth aspect of the invention, and a regulator being capable of receiving said signal and being capable to cause a change in propulsion states between at least two wheels of said vehicle, wherein said change in propulsion states is dependent on the information carried by said signal.

According to a seventh aspect of the invention, a computer program product comprising a computer readable medium having thereon computer program code is provided. The computer program code is loadable into a processing unit and adapted to cause performing of the method according to the first, second, third, or fourth aspect when said computer program code is executed by the processing unit.

BRIEF DESCRIPTION OF THE DRAWINGS

Hereinafter, the invention will be described with reference to the appended drawings, wherein:

FIG. 2a is a model of a four wheeled vehicle with lateral torque vectoring on the rear axle and a front biased longitudinal torque distribution;

FIG. 2b is a model of a four wheeled vehicle with lateral torque vectoring on the rear axle and a rear biased longitudinal torque distribution;

DESCRIPTION OF EMBODIMENTS

Figure 1A:
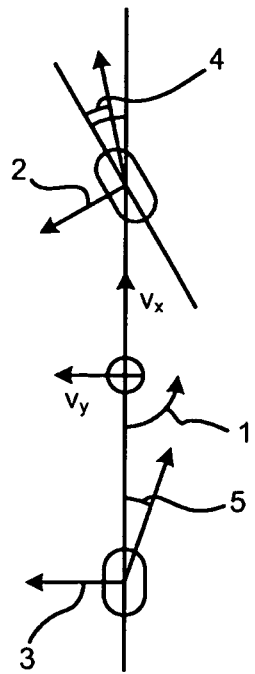
FIG. 1a is a bicycle model with lateral tire forces and the net yaw moment acting on the model, excluding longitudinal tire forces.
Figure 1B:
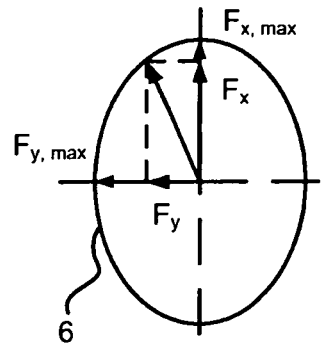
FIG. 1b is a schematic view of the tire force ellipse.
Figure 1C:
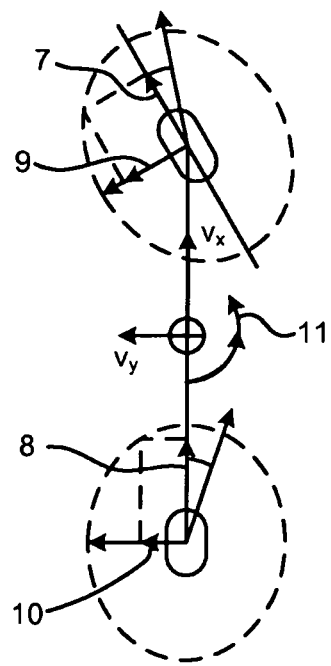
FIG. 1c is a bicycle model with the tire forces and the net yaw moment acting on the model, including longitudinal tire forces.
Figure 3:
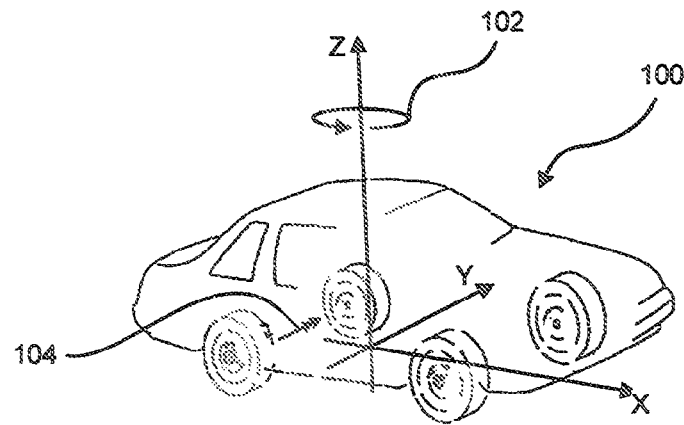
FIG. 3 is a perspective view of a vehicle.

With reference to FIG. 3, a perspective view of a vehicle 100 is shown. The vehicle is able to drive within the plane defined by the x-y plane, and it may be subject to a yaw moment 102 acting around the z-axis. The vehicle is further equipped with a torque vectoring device (not shown) being capable of shuffling torque 104 sideways between the left and right wheel of the rear axle, as is indicated by the arrow in the figure.

Figure 4:
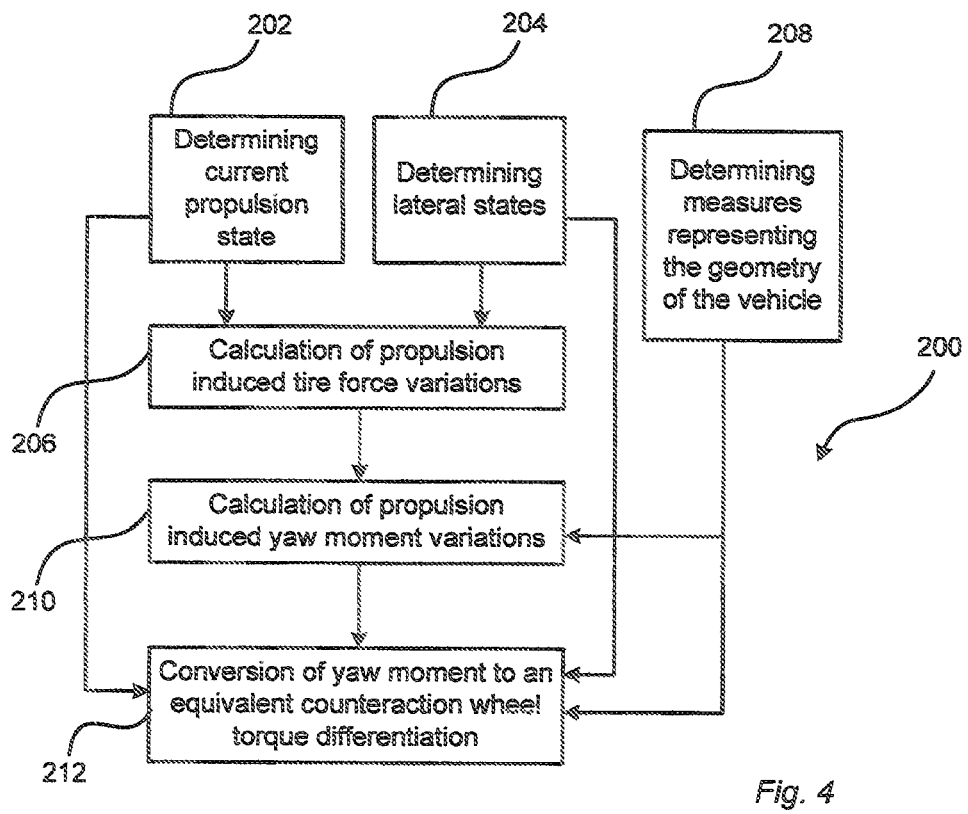
FIG. 4 is a schematic flowchart of a method according to an embodiment of the present invention.

Now turning to FIG. 4, a method scheme 200 for determining yaw tendency of a vehicle is shown. Starting at 202, a current propulsion state of at least one wheel of the vehicle is determined. Preferably, a propulsion state is a measure representing the longitudinal tire slip of a wheel and being selected from the group consisting of torque, force, slip, friction utilization, or differential speed. At 204, the lateral states of the vehicle and the tires are determined. In this context, a lateral state may be any measure representing the lateral force, or force utilization, of a tire or the vehicle, derived from lateral acceleration, lateral velocity, slip angles, lateral load transfer, etc.

The determined propulsion state as well as the lateral states is used as input in 206, in which step those states are used to calculate propulsion induced tire force variations.

Further, in 208 measures representing the geometry of the vehicle are determined, and used together with the calculated tire force variations from 206 as input to 210. Here, propulsion induced yaw moment variations are calculated from the output of 208 and 206. So far, the method 200 describes a conceptual layout for yaw moment variations.

For applying a conversion from net yaw moment to differentiated wheel torque, the method 200 further includes a step 212, which uses the calculated propulsion induced yaw moment variations from 210, as well as the current propulsion state of at least one wheel from 202, the lateral states of the vehicle and the tires from 204, and the vehicle's geometry from 208, to convert the yaw moment to an equivalent counteraction wheel torque differentiation. The output from 212 may then be used as input to a torque vectoring device of the vehicle, which device will be described further below.

Figure 5A:
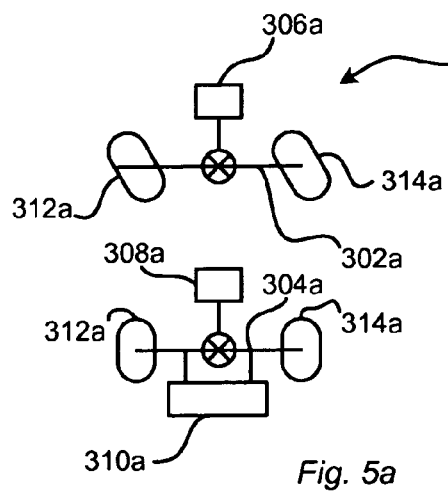
FIG. 5a-d are schematic views of vehicles having different driveline configurations.

Now referring to FIGS. 5a-d, different drive line configurations of vehicles 300a, 300b, 300c, 300d are shown, for which vehicles the longitudinal torque distribution can be changed. In FIG. 5a, the vehicle 300a has a front axle 302a and a rear axle 304a. A first propulsion plant 306a is arranged to provide a torque to the front axle 302a, and a second propulsion plant 308a is arranged to provide a torque to the rear axle 304a. Independently of each other, the first and second propulsion plants 306a, 308a may be an electric motor, a combustion engine, or any other means known per se and being suitable for driving an axle of a vehicle. A torque vectoring device 310a, i.e. a device capable of providing a torque difference between a left wheel 312a and a right wheel 314a of a common axle is also provided on the rear axle 304a. However, the torque vectoring device 310a may also be arranged on the front axle 302a, or two individual torque vectoring devices 310a may be arranged on the front axle 302a and the rear axle 304a, respectively.

Figure 5B:
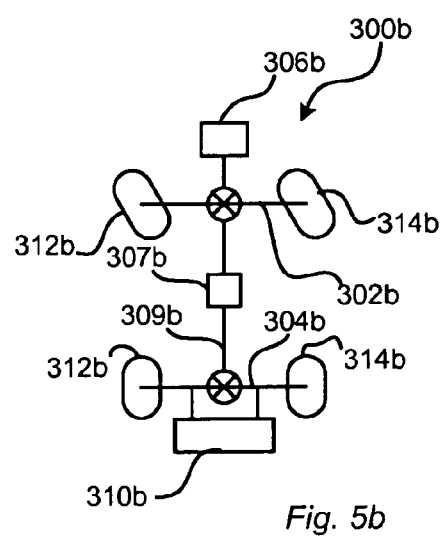

In FIG. 5b, the vehicle 300b has a front axle 302b and a rear axle 304b. A propulsion plant 306b is arranged to provide a torque to the front axle 302b, and a hang-on center clutch 307b is arranged to transmit torque to the rear axle 304a via a cardan shaft 309b. The propulsion plant 306b may be an electric motor, a combustion engine, or any other means known per se and being suitable for driving an axle of a vehicle. A torque vectoring device 310b, i.e. a device capable of providing a torque difference between a left wheel 312b and a right wheel 314b of a common axle is also provided on the rear axle 304b. However, the torque vectoring device 310b may also be arranged on the front axle 302b, or two individual torque vectoring devices 310b may be arranged on the front axle 302b and the rear axle 304b, respectively.

Figure 5C:
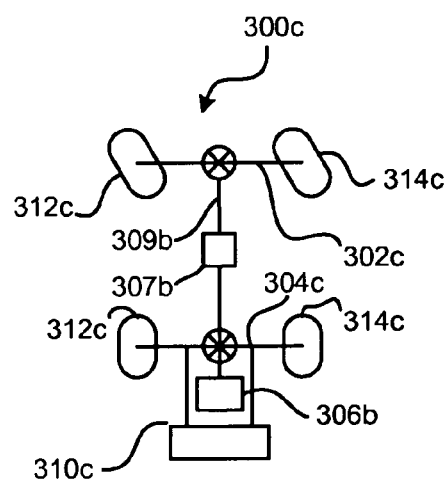

In FIG. 5c, the vehicle 300c is similar to the vehicle 300b shown in FIG. 5b, however the propulsion plant 306c is arranged at the rear axle 304c. Also in this case, the torque vectoring device 310c may be arranged on the rear axle 304c, the front axle 302c, or on both.

Figure 5D:
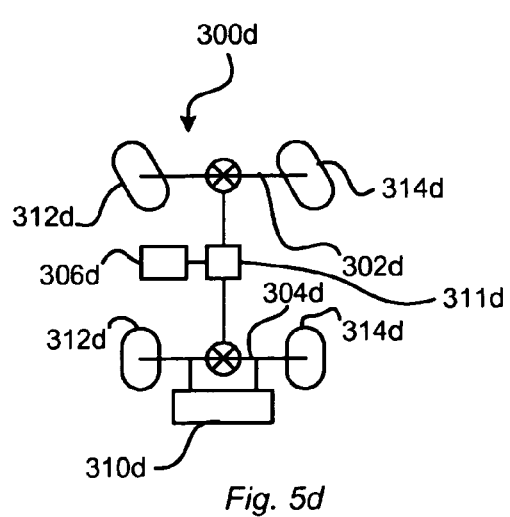

In FIG. 5d, a propulsion plant 306d is connected to a longitudinal torque distribution device 311d, such as a torque vectoring device, a Torsen differential, a center differential, etc. In case of a center differential, friction brakes may or may not be included. Also in this case, the torque vectoring device 310d for providing a torque difference between a right wheel and a left wheel may be arranged on the rear axle 304c, the front axle 302c, or on both.

The torque vectoring device 310a-d is a device being capable of creating a torque difference between two wheels on an axle. Preferably, the torque vectoring device 310a-d comprises a motor for applying a torque difference by providing an additional torque to the wheels. This is most preferably done by a device which when activated applies a first torque to one of the wheels of an axle, and a second torque to the other wheel of said axle, said first and second torque having opposite directions.

Now with reference to FIGS. 6a-c, a sequence according to an embodiment will be explained on a conceptual level. A vehicle 400 is equipped with a front axle 402, a rear axle 404, and two individual propulsion plants 406, 408 arranged on each one of the axles 402, 404. A torque vectoring device 410 is arranged on the rear axle 404, similar to the vehicle shown in FIG. 5a. A control unit 420 includes a first module 422 for sending control signals to the front axle propulsion plant 406, a second module 424 for sending control signals to the rear axle propulsion plant 408, and a third module 426 for sending control signals to the torque vectoring device 410.

The gross yaw moment 430 that acts on the vehicle is a result from combined lateral and longitudinal tire forces.

Figure 6A:
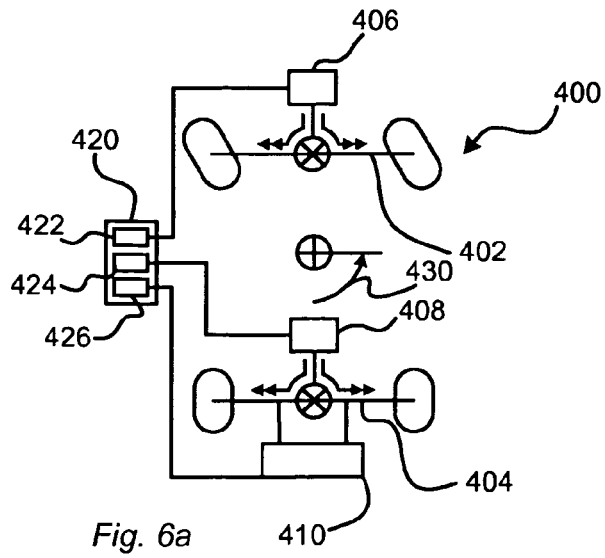
FIG. 6a-c are schematic views of a vehicle equipped with torque vectoring functionality.
Figure 6B:
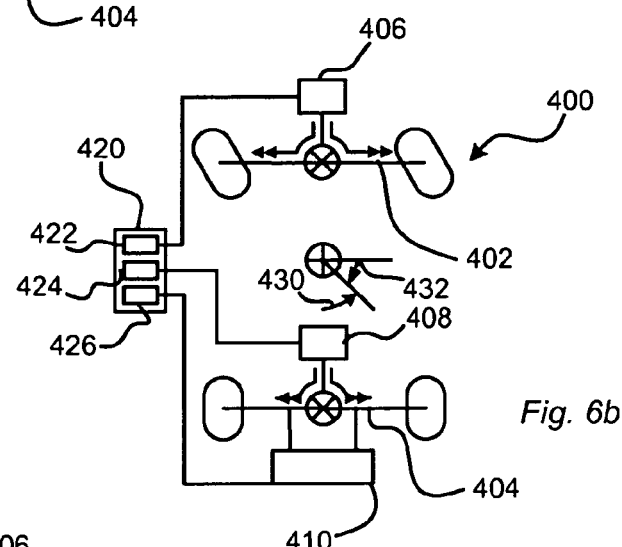
Figure 6C:
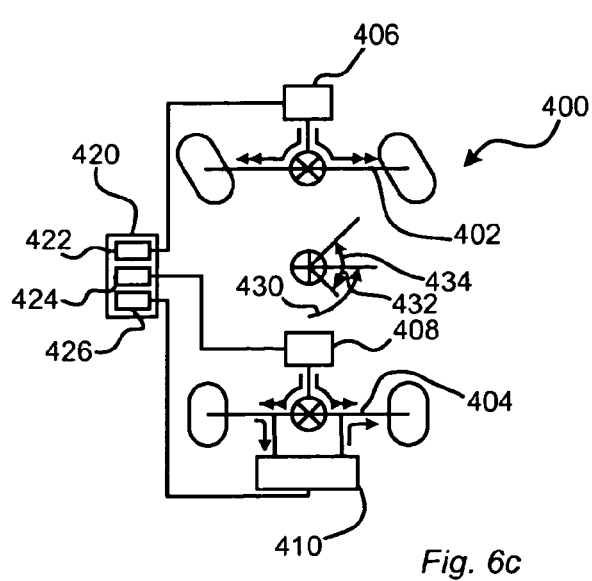

Starting with FIG. 6a, propulsion torques at front and rear axle 402, 404 are held constant and the gross yaw moment 430 is undefined. In FIG. 6b, the relation between front and rear axle torque has changed as a consequence of altered torque commands from at least one of the control unit modules 422, 424. As a consequence of the changed longitudinal torque distribution, the combined slip conditions for front and rear axle have also changed, thus creating a net yaw moment effect 432 on the vehicle, resulting in changed gross yaw moment 430. In FIG. 6c, the net yaw moment 432 from FIG. 6b has been estimated and compensated for by the lateral torque vectoring device 410, which by shuffling half-shaft torque from left to right side at the rear axle 404 creates a counter acting net yaw moment effect 434, thus enabling a change in longitudinal torque distribution without affecting the gross yaw moment 430.

In order to apply an adequate torque difference, the module 426 of the control unit 420 is configured to receive control signals from further modules (not shown), operating according to the scheme previously described with reference to FIG. 4. Thus, the control signal delivered by the module 426 contains or represents the equivalent counteraction wheel torque differentiation as determined in step 212 of FIG. 4. Consequently, a change in yaw moment of the vehicle 400 is caused by the steps of i) determining the original yaw tendency of the vehicle by determining the propulsion states of one or several wheels of said vehicle, and estimating yaw moment variations of a vehicle from said propulsion states, and ii) utilizing said estimated yaw moment variations for changing the difference in torque between the rear left wheel and the rear right wheel of said vehicle. The latter step is thus performed by calculating new values of the propulsion states of said rear left wheel and said rear right wheel counteracting the estimated yaw moment variations, and by applying said new values to said left wheel and said right wheel by means of the torque vectoring device 410.

As an example, a cornering vehicle equipped with lateral torque vectoring functionality is considered. The vehicle, being subject to an unknown gross yaw moment, is suddenly subject to a change in longitudinal torque distribution. This may for example be the case when a hybrid vehicle changes propulsion unit from one plant to another, which may be done either by driver request or automatically. In order to compensate for the net yaw moment caused by said change in torque distribution, a sequence for determining the net yaw moment is performed. Hence, the propulsion states of e.g. the left and right rear wheels are determined and used for calculating said net yaw moment. Further to this, new values of the propulsion states of the left and right rear wheels are calculated and said values are used for generating a signal to the torque vectoring device of the vehicle. The torque vectoring device, e.g. being arranged at the rear axle and being able to shuffle torque between the rear left and right wheel according to what has previously been described, is then activated according to the generated signal such that the left and right rear wheels are subject to the newly calculated values representing the desired propulsion states. Hence, the net yaw moment caused by the change in longitudinal torque distribution is thus counteracted such that the vehicle behavior is more consistent.

The sequence shown in FIGS. 6a-c could also be implemented for any other drive line configuration of those being described with reference to FIGS. 5a-d.

The invention may be implemented in any suitable form including hardware, software, firmware or any combination of these. However, preferably, the invention is implemented as computer software running on one or more data processors (e.g. central processing units, CPU) and/or digital signal processors (DSP). The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

It will be appreciated that the embodiments described in the foregoing may be combined without departing from the scope as defined by the appended patent claims. Although the present invention has been described above with reference to specific embodiments, it is not intended to be limited to the specific form set forth herein. Rather, the invention is limited only by the accompanying claims and, other embodiments than the specific above are equally possible within the scope of these appended claims.

In the claims, the term "comprises/comprising" does not exclude the presence of other elements or steps. Furthermore, although individually listed, a plurality of means, elements or method steps may be implemented by e.g. a single unit or processing unit, such as a central processing unit (CPU), but it can alternatively be a digital signal processor (DSP), or other programmable electronic logic device such as an application-specific integrated circuit (ASIC) or field-programmable gate array (FPGA). Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A method for causing a change in yaw moment of a vehicle being subject to induced yaw moment variations due to altered torque or slip distribution between a front axle and a rear axle of said vehicle, comprising:
   determining at least one propulsion state of one or several wheels of said vehicle,
   determining the yaw tendency by estimating yaw moment variations of a vehicle from said at least one propulsion state, and
   utilizing said estimated yaw moment variations for changing the difference in torque, slip, or speed between a left wheel and a right wheel of said vehicle by
   i) calculating new values of the propulsion states of said left wheel and said right wheel counteracting the estimated yaw moment variations, and
   ii) applying said new values to said left wheel and said right wheel by means of a torque vectoring device which when activated applies a first torque to one of the wheels of an axle, resulting in a lateral torque distribution of said axle that is different from the otherwise fixed lateral torque distribution of 50/50 for an open differential, and a second torque to the other wheel of said axle, said first and second torque being superimposed net torques having opposite directions.

2. A method for causing a change in yaw moment of a vehicle being subject to yaw moment variations induced by altered torque or slip distribution between a left wheel and a right wheel of said vehicle, said altered distributions originating from the control of a torque vectoring device which when activated applies a first torque to one of the wheels of an axle, resulting in a lateral torque distribution of said axle that is different from the otherwise fixed lateral torque distribution of 50/50 for an open differential, and a second torque to the other wheel of said axle, said first and second torque being superimposed net torques having opposite directions, comprising:
   determining at least one propulsion state of one or several wheels of said vehicle,
   determining the yaw tendency by estimating yaw moment variations of a vehicle from said at least one propulsion state, and
   utilizing said estimated yaw moment variations for changing the difference in torque, slip, or speed between the front axle and the rear axle of said vehicle by
   i) calculating new values of the propulsion states of said front axle and said rear axle counteracting the estimated yaw moment variations, and
   ii) applying said new values to said front axle and said rear axle.

3. The method according to claim 1, wherein said at least one propulsion state is a measure representing the longitudinal tire slip of a wheel comprising at least one of torque, force, slip, friction utilization, or differential speed.

4. The method according to claim 1, wherein said at least one propulsion state is a measure representing the longitudinal tire slip values of two wheels of a common side, common axle, or common diagonal comprising at least one of:
   i) torque distribution, force distribution, slip distribution or distribution of mue utilization; or
   ii) torque, force, slip, mue utilization or differential speed.

5. A device for applying a difference of the propulsion states between at least two wheels of a vehicle, said device comprising
   a controller for determining the yaw tendency of a vehicle being subject to induced yaw moment variations due to altered torque or slip distribution between a front axle and a rear axle of said vehicle, comprising
   a determination unit configured to determine at least one propulsion state of one or several wheels of said vehicle,
   an estimation unit configured to estimate yaw moment variations of a vehicle from said at least one propulsion state,
   a calculating unit configured to estimate new values of at least one propulsion state of at least one wheel of said vehicle to counteract the estimated yaw moment variations,
   a signal generator configured to generate a signal corresponding to said estimated new values of the at least one propulsion state, and
   a regulator being constructed and arranged to receive said signal and to cause a change in propulsion states between at least two wheels of said vehicle by means of a torque vectoring device which when activated applies a first torque to one of the wheels of an axle, and a second torque to the other wheel of said axle, resulting in a lateral torque distribution of said axle that is different from the otherwise fixed lateral torque distribution of 50/50 for an open differential, said first and second torque being superimposed net torques having opposite directions, wherein said change in propulsion states is dependent on the information carried by said signal.

6. A device for applying a difference of the propulsion states between the front and rear axle of a vehicle, said device comprising a controller for determining the yaw tendency of a vehicle being subject to yaw moment variations induced by altered torque or slip distribution between a left wheel and a right wheel of said vehicle, said altered distributions originating from the control of a torque vectoring device which when activated applies a first torque to one of the wheels of an axle, and a second torque to the other wheel of said axle, resulting in a lateral torque distribution of said axle that is different from the otherwise fixed lateral torque distribution of 50/50 for an open differential, said first and second torque being superimposed net torques having opposite directions, comprising a determination unit configured to determine at least one propulsion state of one or several wheels of said vehicle, an estimation unit configured to estimate yaw moment variations of a vehicle from said at least one propulsion state, a calculating unit configured to estimate new values of at least one propulsion state of at least one wheel of said vehicle to counteract the estimated yaw moment variations, a signal generator configured to generate a signal corresponding to said estimated new values of the at least one propulsion state, and a regulator being constructed and arranged to receive said signal and to cause a change in propulsion states between the front axle and the rear axle, wherein said change in propulsion states is dependent on the information carried by said signal.

7. A computer program product comprising a computer readable medium having thereon computer program code, the computer program code being loadable into a processing unit and adapted to cause performing of the method according to claim 1 when said computer program code is executed by the processing unit.

8. The method according to claim 2, wherein said at least one propulsion state is a measure representing the longitudinal tire slip of a wheel comprising at least one of torque, force, slip, friction utilization, or differential speed.

9. The method according to claim 2, wherein said at least one propulsion state is a measure representing the longitudinal tire slip values of two wheels of a common side, common axle, or common diagonal comprising at least one of:

i) torque distribution, force distribution, slip distribution or distribution of mue utilization; or ii) torque, force, slip, mue utilization or differential speed.

10. A computer program product comprising a computer readable medium having thereon computer program code, the computer program code being loadable into a processing unit and adapted to cause performing of the method according to claim 2 when said computer program code is executed by the processing unit.

* * * * *